UNITED STATES PATENT OFFICE 2,666,758

AZO COMPOUNDS HAVING ALKOXY AND CYANO GROUPS

John Raven Johnson, Ithaca, N. Y., assignor to E. I. du Pont de Nemours & Company, Wilmington, Del., a corporation of Delaware No Drawing. Application May 26, 1949, Serial No. 95,571

3 Claims. (Cl. 260—192)

This invention relates to new aliphatic azo compounds containing alkoxy groups and to the use thereof in the addition polymerization of polymerizable organic compounds.

In addition polymerization processes the catalysts or initiators hitherto most frequently mentioned in the art and also most widely used are in general peroxidic compounds, e. g. benzoyl peroxide, ammonium persulfate, etc. The peroxidic catalysts while valuable and useful have certain disadvantages, e. g. discoloration of polymer, decoloration of dyestuffs added to the monomer, insolubilization of the polymer, etc.

This invention has as an object the provision of new compounds. A further object is the provision of new catalysts or initiators for addition polymerization of polymerizable ethylenic compounds. Another object is the provisions of new catalysts or initiators for chain mechanism reactions promoted by free radicals. Other objects will appear hereinafter.

These objects are accomplished by the invention of azo compounds which have the acyclic azo, —N=N—, group bonded to discrete nonaromatic carbons, i. e., carbons aliphatic in character, i. e., aliphatic or cycloaliphatic, at least one of which carbons is tertiary, i. e., attached to three other carbons by single bonds, one of the carbons attached to the tertiary carbon bearing an alkoxy group and another of the carbons attached to the tertiary carbon having its three remaining valences satisfied only by elements of atomic number of seven to eight, i. e., oxygen and/or nitrogen and by the invention of a process wherein an ethylenically unsaturated compound subject to addition polymerization is polymerized by bringing the same in contact, under polymerizing conditions, with such an azo compound.

The azo compounds of this invention may be obtained by reacting a ketone having an alkoxy group attached to aliphatic carbon attached to the keto carbon with hydrazine followed by reaction with hydrogen cyanide and then by oxidation of the resultant hydrazo compound with chlorine or bromine to give the azonitrile. The nitrile group can be converted into various derivatives, e. g. esters or amides through the imide hydrochloride.

The following examples in which the parts given are by weight further illustrate the principles involved in this invention. Example I shows a representative azonitrile. The subsequent examples illustrate the use of the compound in the polymerization of ethylenically unsaturated compounds.

EXAMPLE I

A mol of methoxyacetonitrile (prepared according to the method of Organic Syntheses, col. vol. 2, page 387, John Wiley, 1944) was added to a mol of methylmagnesium bromide in ether solution. After adding aqueous hydrochloric acid to the solution and ether extraction, methoxyacetone was obtained from the ether extract. A total of 29 parts of methoxyacetone was mixed with 8 parts of hydrazine hydrate and heated at 90–100° C. for 4 hours. To this solution was added about 42 parts of hydrogen cyanide. After about 16 hours at 30° C., the excess hydrogen cyanide was removed by evaporation and 100 parts of water, 20 parts of ethanol, and about 30 parts of concentrated hydrochloric acid were added. Chlorine was introduced until an excess of the halogen was present. The solid product which was obtained (26 parts) was crystallized from methanol to give two forms of the alpha,alpha'-azobis(alpha - methyl - beta - methoxypropionitrile) one crystallizing from methanol at 0° C. and melting at 112–114° C. with decomposition and the other crystallizing at —56° C. from the filtrate from the first form and melting at 60–62° C.

Analysis

Calculated for $C_{10}H_{16}O_2N_4$: C, 53.6%; H, 7.1%; N, 25.0%

Found: C, 53.6%; H, 7.4%; N, 24.6%

EXAMPLE II

A container, charged with 20 parts of acrylonitrile, 80 parts of cyclohexane and 0.137 part of alpha,alpha' - azobis(alpha - methyl - beta-methoxypropionitrile) melting at 60–62° C., was heated at 60° C. for 4 hours. There was obtained a 21% yield of polymeric acrylonitrile. No difference in polymerization or properties of the polymer was observed when the high melting form of the azonitrile was substituted for the lower melting form.

EXAMPLE III

A 28% yield of polyvinyl chloride was obtained by heating 100 parts of vinyl chloride at 90° C. for 10 hours with 0.1 part of alpha,alpha'-azobis(alpha - methyl - beta - methoxypropionitrile).

EXAMPLE IV

A 100% conversion of monomeric vinyl acetate to polyvinyl acetate was obtained by treatment of 100 parts of vinyl acetate in 80 parts of tertiary-butyl alcohol with 0.1 part of the azonitrile obtained as described in Example I at 30° C. for 10 hours. The polymer had a relative viscosity of 1.275 in chloroform at a concentration of 0.1%.

EXAMPLE V

A stainless-steel pressure-resistant vessel was charged with 80 parts of benzene and 0.1 part of alpha,alpha' - azobis(alpha - methyl - beta - methoxy-propionitrile) having a melting point of 112–114° C. with decomposition. The reactor was closed, flushed with nitrogen, evacuated and pressured with ethylene. The temperature was maintained at 80° C. for 9 hours with an ethylene pressure of 870–1000 atmospheres. There was obtained about 9 parts of ethylene polymer which had a tensile strength of 2740 lb./sq. in. at 28% elongation and a tear strength of 0.04 lb./mil thickness.

When the experiment was repeated with the isomeric form of the catalyst, which melted at about 61° C., the polymer had a tensile strength of 2650 lb./sq. in. at 560% elongation and a tear strength of .78 lb./mil thickness.

The present invention is generic to non-aromatic azo compounds, i. e., azo compounds aliphatic in character, i. e., aliphatic and cycloaliphatic azo compounds in which azo compounds the acyclic azo, —N=N—, group is attached to two radicals aliphatic in character, i. e., aliphatic or cycloaliphatic, i. e., non-aromatic and in which the azo group is attached to two carbons, one at least of which is tertiary, i. e., has thereon three carbons, one of which bears an alkoxy group of one to six carbons and another of which has its remaining valences satisfied by oxygen and/or nitrogen. Thus on said tertiary carbon there is for example a cyano, carbonamido, or carbalkoxy group with the alkyl of the carbalkoxy group preferably of one to six carbons, e. g. methyl to hexyl.

The present invention is generic to azo compounds thus formulated, including alpha,alpha'-azobis(alpha - methyl - beta - methoxypropionitrile), alpha,alpha' - azobis(alpha - methyl-beta - n - butoxypropionitrile), alpha,alpha'-azobis(alpha - isobutyl - beta - methoxypropionitrile), and the corresponding amides and lower (one to six carbons) alkyl carbalkoxy esters. The esters and amides are readily obtained from the nitrile by formation of the corresponding ether hydrochloride by reaction with an alcohol and hydrogen chloride followed by treatment with water or ammonia or a hydrogen-bearing amine (primary or secondary amine). In general the more useful compounds are the azonitriles which have discrete aliphatic or alicyclic groups containing 5 to 11 carbons attached to each of the valences of the azo group. The preferred compounds are of the formula $R_1OCH_2C(CN)(R_2)—N=N—C(CN)(R_3)CH_2OR_4$ wherein $R_1$ and $R_4$ are lower alkyls of one to four carbons and $R_2$ and $R_3$ are aliphatic radicals and preferably alkyls of one to four carbons.

These compounds can be prepared by the following steps: (a) treatment of the ketone having an alkoxy on carbon directly attached to the keto carbon with hydrazine to form the azine, (b) treatment of the resultant azine with hydrogen cyanide to form the corresponding hydrazonitrile, (c) oxidation of the hydrazonitrile with chlorine or bromine to give the azonitrile. Although the above steps can be carried out in aqueous medium if the alkoxyketone is soluble in water, it is preferred that step (b) be carried out in the presence of hydrogen cyanide having a relatively small amount of water. Steps (a) and (b) are preferably carried out at moderate temperatures such as 25–75° C. while the oxidation step (c) which is in an aqueous medium is generally at lower temperatures, e. g., —5 to 10° C.

The azo compounds of this invention and particularly the azonitriles may be used as catalysts for chain reactions, e. g. chlorination, and chlorosulfonation, and particularly as polymerization catalysts in the addition polymerization, including copolymerization, of polymerizable compounds containing ethylenic double bonds and are of generic utility in such polymerizations. Ethylenic compounds subject to addition polymerization are of generic utility including monoolefins, e. g., ethylene, isobutylene and styrene; diolefins, particularly butadiene; vinyl esters, e. g., vinyl chloride, vinyl fluoride, vinyl acetate, vinyl propionate; vinylidene halides, e. g., vinylidene chloride and fluoride; vinyl ethers and ketones, e. g., vinyl butyl ether and methyl vinyl ketone; acrylyl and methacrylyl compounds e. g., acrylonitrile, methyl methacrylamide; polyfluoroolefins, e. g., tetrafluorethylene, trifluorochloroethylene and 1,1-difluoro-2,2-dichloroethylene; and compounds containing two or more isolated or conjugated double bonds, e. g., the diacrylic acid esters of glycols and polyethylene glycols; for example, tetraethylene glycol dimethacrylate, diallyl diglycolate, diallyl carbonate, diallyl phthalate, chloroprene, and fluoroprene. A particularly important group to which the majority of the above polymerizable compounds belong is that of polymerizable compounds having a $$CH_2=C<$$

group, i. e. a terminal ethylenic double bond, i. e., a terminal methylene group.

The amount of the azo compound to be employed varies between 0.001 and 5% based on the weight of the polymerizable compounds present although usually between 0.1 and 3% is used. The temperature usually employed is 40–125° C. or higher. Lower temperatures can be used when light is employed in conjunction with the azo compound. The polymerization can be carried out in bulk or emulsion systems.

In addition to the use of the azo compounds of this invention as polymerization catalysts, decomposition of the azo compounds by heating until nitrogen is evolved produces the corresponding dibasic acid derivatives in which the carboxylic derivative groups, e. g., the nitriles, are attached to adjacent carbons as illustrated by the equation $R_1OCH_2C(CN)(R_2)—N=N—C(CN)(R_3)CH_2OR_4$
$\rightarrow N_2 + R_1OCH_2C(CN)(R_2)—C(CN)(R_3)CH_2OR_4$ wherein $R_1$, $R_2$, $R_3$, and $R_4$ are, as above, preferably alkyl radicals of one to four carbons. Such derivatives may be used as intermediates in organic reactions.

The foregoing detailed description has been given for clearness of understanding only and no unnecessary limitations are to be understood therefrom. The invention is not limited to the exact details shown and described for obvious

What is claimed is:

1. Alpha,alpha' - azobis(alpha - methyl - beta - methoxypropionitrile).

2. An acyclic azo compound wherein the azo, —N=N—, group has both its valences satisfied by cyanoalkoxyalkyl radicals of 5 to 11 carbons wherein the cyano radical is on tertiary carbon attached to the azo group and the alkoxy radical is of one to six carbons and attached to carbon attached to said tertiary carbon.

3. An acyclic azo compound of the formula $ROCH_2C(CN)(R)-N=N-C(CN)(R)CH_2OR$ wherein R is an alkyl radical of one to four carbons.

JOHN RAVEN JOHNSON.

References Cited in the file of this patent

UNITED STATES PATENTS

| Number | Name | Date |
|---|---|---|
| 2,471,959 | Hunt | May 31, 1949 |
| 2,492,763 | Pinkney | Dec. 27, 1949 |